(12) United States Patent
Bar-Niv

(10) Patent No.: US 12,099,425 B2
(45) Date of Patent: Sep. 24, 2024

(54) AUTOMATED TESTING OF DIGITAL KEYS FOR VEHICLES

(71) Applicant: Google LLC, Mountain View, CA (US)

(72) Inventor: Adam M. Bar-Niv, Los Altos, CA (US)

(73) Assignee: Google LLC, Mountain View, CA (US)

( * ) Notice: Subject to any disclaimer, the term of this patent is extended or adjusted under 35 U.S.C. 154(b) by 7 days.

(21) Appl. No.: 18/063,386

(22) Filed: Dec. 8, 2022

(65) Prior Publication Data

US 2024/0193057 A1    Jun. 13, 2024

(51) Int. Cl.
*G06F 11/00* (2006.01)
*G06F 11/27* (2006.01)
*B60R 25/24* (2013.01)

(52) U.S. Cl.
CPC .............. *G06F 11/27* (2013.01); *B60R 25/24* (2013.01)

(58) Field of Classification Search
CPC ........................................................ G06F 11/27
USPC ........................................................ 714/1-57
See application file for complete search history.

(56) References Cited

U.S. PATENT DOCUMENTS

| | | | | |
|---|---|---|---|---|
| 6,253,163 B1* | 6/2001 | Lapie | ................... | G07F 7/1008 714/25 |
| 10,682,980 B1* | 6/2020 | Ghamsari | ................ | G06F 21/31 |
| 2003/0033558 A1* | 2/2003 | Parvathala | ............ | G06F 11/263 714/30 |
| 2005/0034028 A1* | 2/2005 | Son | ................... | G06K 7/10465 714/43 |
| 2006/0080580 A1* | 4/2006 | Conti | ...................... | G06F 21/71 714/782 |
| 2010/0100766 A1* | 4/2010 | Bengtsson | ............ | H04W 24/06 714/E11.178 |
| 2010/0281301 A1* | 11/2010 | Lepek | ...................... | H04B 5/45 714/30 |
| 2014/0365832 A1* | 12/2014 | Neeb | ................... | G06F 13/1673 710/310 |
| 2015/0113331 A1* | 4/2015 | Bhattacharya | ...... | G06F 11/3688 714/38.1 |
| 2015/0289152 A1* | 10/2015 | Shanmugam | ........ | H04W 24/04 455/425 |

(Continued)

FOREIGN PATENT DOCUMENTS

| | | |
|---|---|---|
| CN | 113111007 A | 7/2021 |
| CN | 114172835 A | 3/2022 |

(Continued)

OTHER PUBLICATIONS

Carconnectivity, "Whitepaper CCC Digital Key—The Future of Vehicle Access", Mar. 30, 2020, 20 pp., URL: https://carconnectivity.org/wp-content/uploads/2022/11/CCC_Digital_Key_Whitepaper_Approved.pdf.

(Continued)

*Primary Examiner* — Sarai E Butler
(74) *Attorney, Agent, or Firm* — Shumaker & Sieffert, P.A.

(57) ABSTRACT

A method of testing a digital key is described that provides, from a digital key test manager device, standard digital key instructions for a computing device to send messages to a device under test; communicates, from the digital key test manager device, with the device under test to determine operations of the device under test as a result of the messages; and evaluates, at the digital key test manager device, the operations of the device under test to assess functionality of the digital key.

18 Claims, 13 Drawing Sheets

(56) References Cited

U.S. PATENT DOCUMENTS

| | | | |
|---|---|---|---|
| 2019/0205182 A1 | 7/2019 | Sivasubramanian et al. | |
| 2019/0315313 A1 | 10/2019 | Reiser | |
| 2019/0317735 A1* | 10/2019 | Duan | G06F 8/34 |
| 2020/0380202 A1* | 12/2020 | Cass | G06F 40/174 |

FOREIGN PATENT DOCUMENTS

| | | |
|---|---|---|
| CN | 114328256 A | 4/2022 |
| CN | 115188098 A | 10/2022 |

OTHER PUBLICATIONS

International Search Report and Written Opinion of International Application No. PCT/US2023/081833 dated Mar. 22, 2024, 12 pp.

* cited by examiner

AUTOMATED TESTING OF DIGITAL KEYS FOR VEHICLES

BACKGROUND

The evolution of personal computing devices, such as cellular handsets (including so-called "smartphones"), wearable devices (such as so-called smartwatches, smart headsets—e.g., earbuds, smart glasses, head-mounted displays—e.g., extended reality headsets, including virtual reality headsets, augmented reality headsets, and the like, laptop computers, tablet computers, etc., that a user may carry or otherwise maintain on their person has led to a number of evolving use cases that enable interactions with different devices, including vehicles. Personal computing devices may, as one example, source a digital key (DK), such as a digital car key (DCK), that allow users to interact with the vehicle, such as an automobile (or, in other words, a car), to lock, unlock, and operate the vehicle This allows the personal computing device to be used as a replacement or backup for conventional car keys.

However, as the number of different personal computing devices grow (both in terms of different models from different manufacturers and different versions of the same model from the same manufacturer) and the number of computing devices (which, by way of example, may refer to different models and trims of vehicles and even different head units within the same model and trim of a given vehicle) increases, testing of digital keys grows exponentially. As testing may be performed manually, the testing of digital keys may require an extensive amount of time, especially if the digital key application fails certification due to software bugs, hardware irregularities, and the like. Manual testing may be expensive and subject to human errors. Since each digital key device and vehicle may have a different way of being operated, manual testing may also require substantial knowledge by the tester and require a significant ramp up time.

SUMMARY

In general, techniques of this disclosure are directed to automated testing of digital keys for interacting with another computing device, including computing devices present in vehicles—such as an automobile (or, in other words, a car, where such computing devices are referred to as head units), a motorcycle, an electronic bike (which may be referred to as an e-bike), farm equipment, airplanes, etc.,—home automation systems (e.g., a smart-lock), and/or any other computing device that secures access to and/or operation of the computing device using digital keys. Rather than resorting to manual testing of individual computing devices relative to different head units or other computing devices, the techniques described in this disclosure provide a uniform digital key test application programming interface (API) that may automate the testing of various combinations of digital key application software, the underlying computing device hardware, the head unit (or another computing device) software, and the head unit (or other computing devices) software.

In general, techniques of this disclosure are directed to the interoperability and/or testability of digital keys. A device test application may interact with a digital key framework and digital key test manager using standardized application programming interfaces (APIs) to reduce the interoperability issues for the digital key applications and make the digital key applications more likely to pass test inspections. A potential problem with digital car keys is that a large number of different vehicle models and digital car key applications produce an interoperability and testing challenge. Each digital car key application must be tested against each vehicle model, and each vehicle model has to be tested against each digital car key application.

A unified testing approach may reduce the effort for new computing devices, digital car key applications, and vehicles to join the ecosystem. Interoperability and functional certifications benefit from unified testing across different devices and vehicles. A shared system testing architecture and infrastructure helps original equipment manufacturers (OEMs) reduce costs by passing a common test criterion as part of self-certification or as a quality check before going to an external lab. A unified automated testing approach may reduce time, expense and human errors that may occur with manual testing.

In one example, the disclosure is directed to method of testing a digital key comprising providing, from a digital key test manager device, standard digital key instructions for a computing device to send messages to a device under test; communicating, from the digital key test manager device, with the device under test to determine operations of the device under test as a result of the messages; and evaluating, at the digital key test manager device, the operations of the device under test to assess functionality of the digital key.

In another example, the disclosure is directed to method of testing a digital key comprising providing, from a digital key test manager device, standard digital key instructions for a computing device to send messages to a device under test; communicating, from the digital key test manager device, with the device under test to determine operations of the device under test as a result of the messages; and evaluating, at the digital key test manager device, the operations of the device under test to assess functionality of the digital key.

In another example, the disclosure is directed to computer-readable storage medium having stored thereon instructions that, when executed, cause one or more processors to: provide standard digital key instructions for a device test application of a computing device to send messages to a device under test; communicate with the device under test to determine operations of the device under test as a result of the messages; and evaluate the operations of the device under test to assess functionality of a digital key In yet another example, the disclosure is directed to system comprising means for providing standard digital key instructions for a device test application of a computing device to send messages to a device under test; means for communicating with the device under test to determine operations of the device under test as a result of the messages; and means for evaluating the operations of the device under test to assess functionality of a digital key The details of one or more examples of the disclosure are set forth in the accompanying drawings and the description below. Other features, objects, and advantages of the disclosure will be apparent from the description and drawings, and from the claims.

DETAILED DESCRIPTION

The systems shown in FIGS. 1A-1F illustrate the automated testing of digital keys with computing device 110 interacting with testing device under test 112 to determine whether specific computing device digital key functionality at the computing device 110 works with a specific device under test 112. Digital key test manager device 110 allows for the automation of the testing with standardized testing instructions.

Figure 1A:
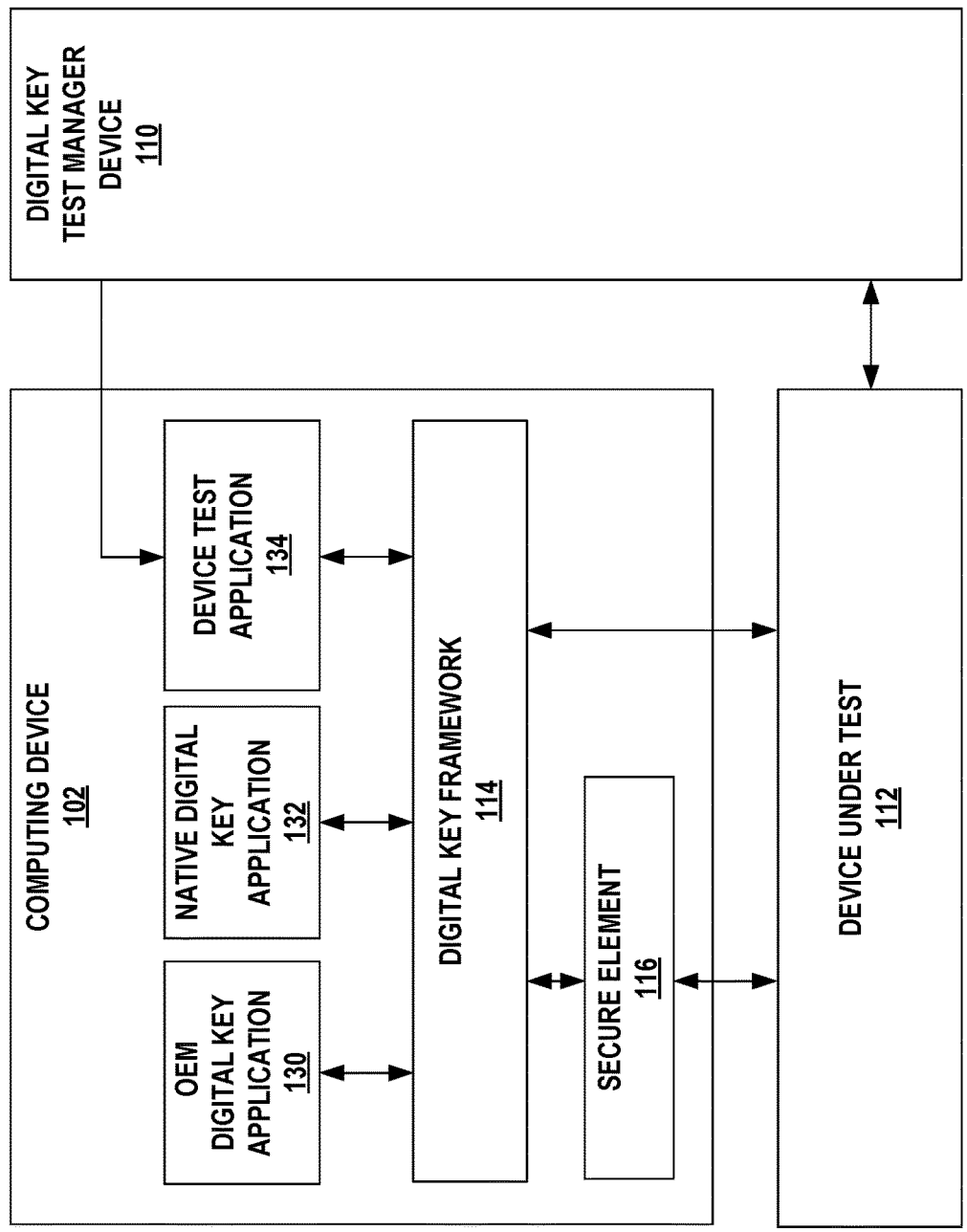
FIG. 1A is a conceptual diagram illustrating a device test application and digital key test manager device, in accordance with one or more techniques of this disclosure.

FIG. 1A is a conceptual diagram illustrating device test application 134 and digital key test manager device 110, in accordance with one or more techniques of this disclosure. Digital key test manager device 110 and device test application 134 at computing device 102 may provide a standardized way of testing device under test 112. Digital key test manager device 110 may interconnect with computing device 102 and device under test 112 using standardized application programming interfaces (APIs) as shown in FIG. 1F discussed below.

Figure 3:
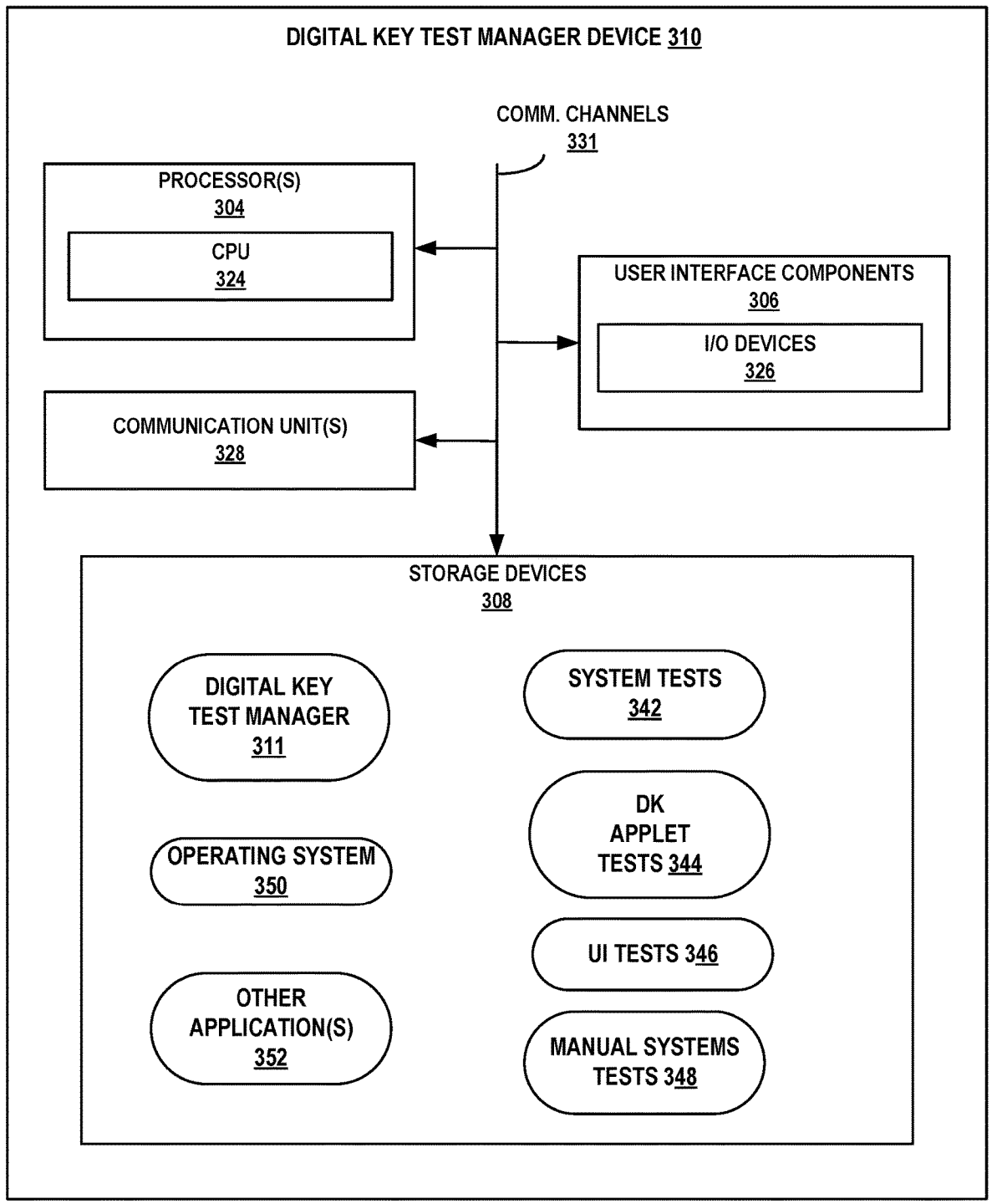
FIG. 3 is a block diagram illustrating a digital key test manager device for digital key testing, in accordance with one or more aspects of the present disclosure.

Digital key test manager device 110 may be a computing apparatus as shown in FIG. 3. Digital key test manager device 110 may be a server, which may be local or remote. Digital key test manager device 110 may comprise multiple or a single computing apparatus. Digital key test manager device 110 may be implemented and reused to run a standard ecosystem test plan. Digital key test manager device 110 may be enhanced to support auxiliary test equipment for automation, such as mechanical fixture 138 discussed below with respect to FIG. 1C. Digital key test manager device 110 and common test APIs may achieve faster development and integration cycles, a lower entry barrier for new adopters, cheaper certification, higher interoperability and better quality at launch and after, and accelerated adoption by the ecosystem and by users. Digital key test manager device 110 and device test application 134 at the computing device 102 may be used for testing flows without dependency on specific digital key applications, such as OEM digital key application 130 and native digital key application 132.

Computing device 102 may include digital key framework 114, vehicle original equipment manufacturer (OEM) digital key application 130, native digital key application 132, and device test application 134. Device test application 134 may be a software layer for translating universal/abstracted commands into vehicle specific commands. Digital key framework 114 may be a standardized application that allows applications such as OEM digital key application 130, native digital key application 132 and device test application 134 to send messages to a vehicle. Digital key framework 114 may interact with Secure Element (SE) 116.

Secure element 116 may be a chip that is protected from unauthorized access and used to run a limited set of applications, as well as store confidential and cryptographic data. Security for digital keys, such as digital car keys, is important so certain standards including the Car Connectivity Consortium's (CCC) Digital Key require the use of secure element 116.

Digital key test manager device 110 may run on a different system (i.e., device\server) to perform test cases that are agnostic to the type of computing device and vehicle tested. Digital key test manager device 110 may test a combination of any digital key (DK) enabled devices, such as computing device 102 (e.g., mobile phone or wearable device), and any device under test, such as device under test 112 (e.g., equivalent test devices\benches\simulations or actual vehicle) using a common set of digital device and vehicle test APIs, discussed below with respect to FIG. 1F.

Device under test 112 has the capacity to respond to, receive instructions from and authenticate the digital key from the computing device. Device under test 112 may be the vehicle to be tested with a computing element such as a head device or other computing element. Alternately, device under test 112 may be a vehicle test bench using vehicle components or a vehicle simulation. Device under test 112 may allow for a digital key test of a specific vehicle from an OEM to test the digital key operation.

As more vehicles and devices join a digital key testing ecosystem, the harder it becomes for new vehicles and devices to join since digital key tests for computing devices need to be done against each different vehicle and digital key tests for vehicles need to be done against each different type of computing device. A unified testing approach reduces the effort to join the ecosystem by reducing the costs related to system testing at all stages of product development.

Further, different digital key applications, such as OEM digital key application 130 and native digital key application 132, have different user interfaces (UIs), and tests that automate UI tend to break often and are hard to maintain. In addition, vehicles and test benches have various non-standardized ways of operation, which also limits automatization and standardization. As discussed below, digital key test manager device 110 and device test application 134 may avoid these problems and enable a uniform, standardized digital key test architecture.

Digital key test manager device 110 may provide standard digital key instructions, such as tests 160 for computing device 120 to send messages to a device under test 112. Digital key test manager device 110 may communicate with device under test 112 to determine the operations of the device under test 112 as a result of the messages. Digital key test manager device 110 may evaluate the operations of device under test 112 to assess the functionality of the digital key.

A first-phase test may not require a connection to a server. A second-phase test (such as tiers 2 and 3 described above) including providing additional standard digital key instructions. The second phase test requires a connection to the server. Digital key test manager device 110 may receive signals from at least one sniffer module 136 shown in FIG. 1B that detects communications from computing device 102 to device under test 412.

Figure 1B:
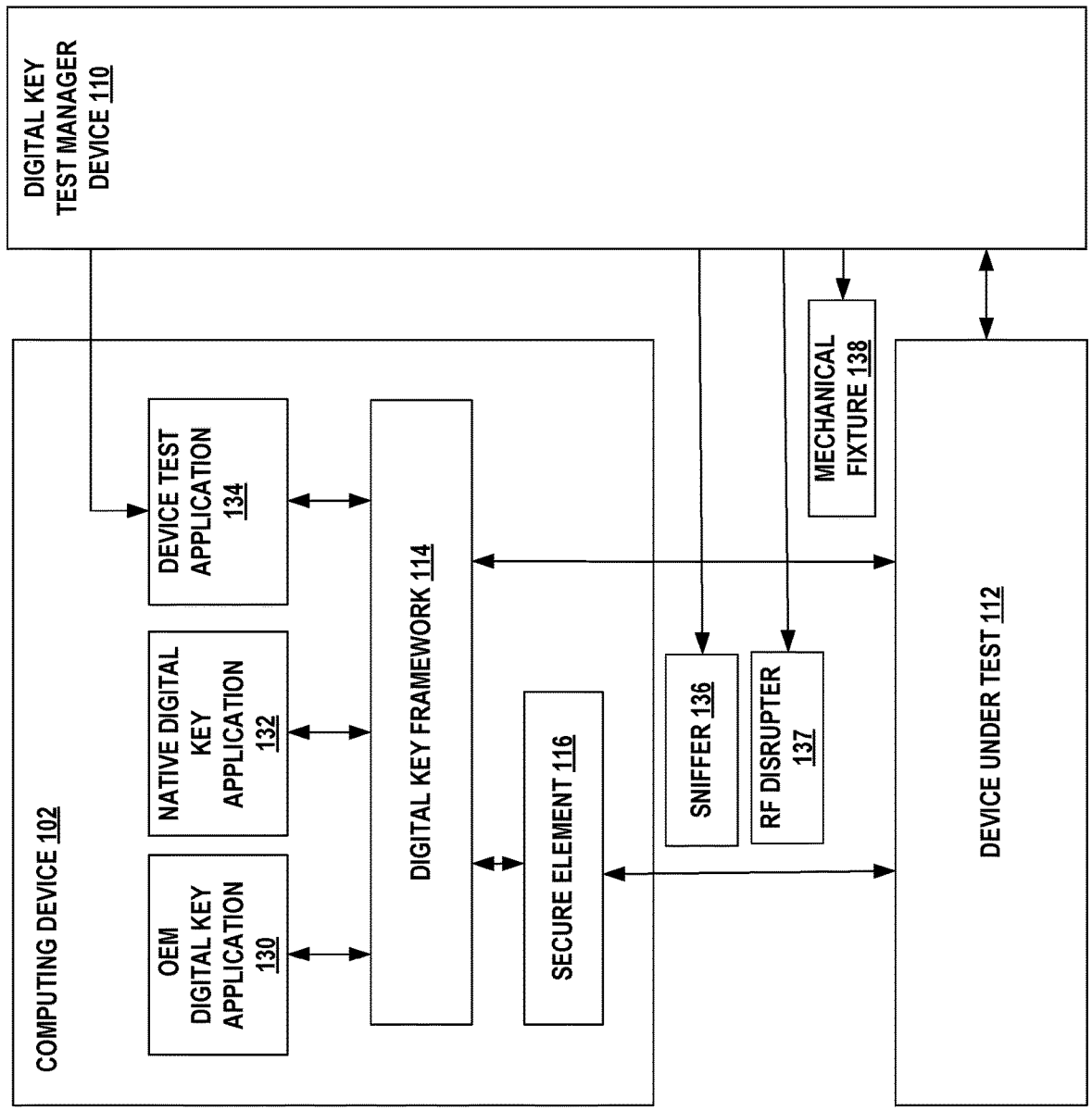
FIG. 1B is a conceptual diagram illustrating a device test application, digital key test manager device, sniffer module, radio frequency (RF) disrupter and mechanical fixture, in accordance with one or more techniques of this disclosure.
Figure 1C:
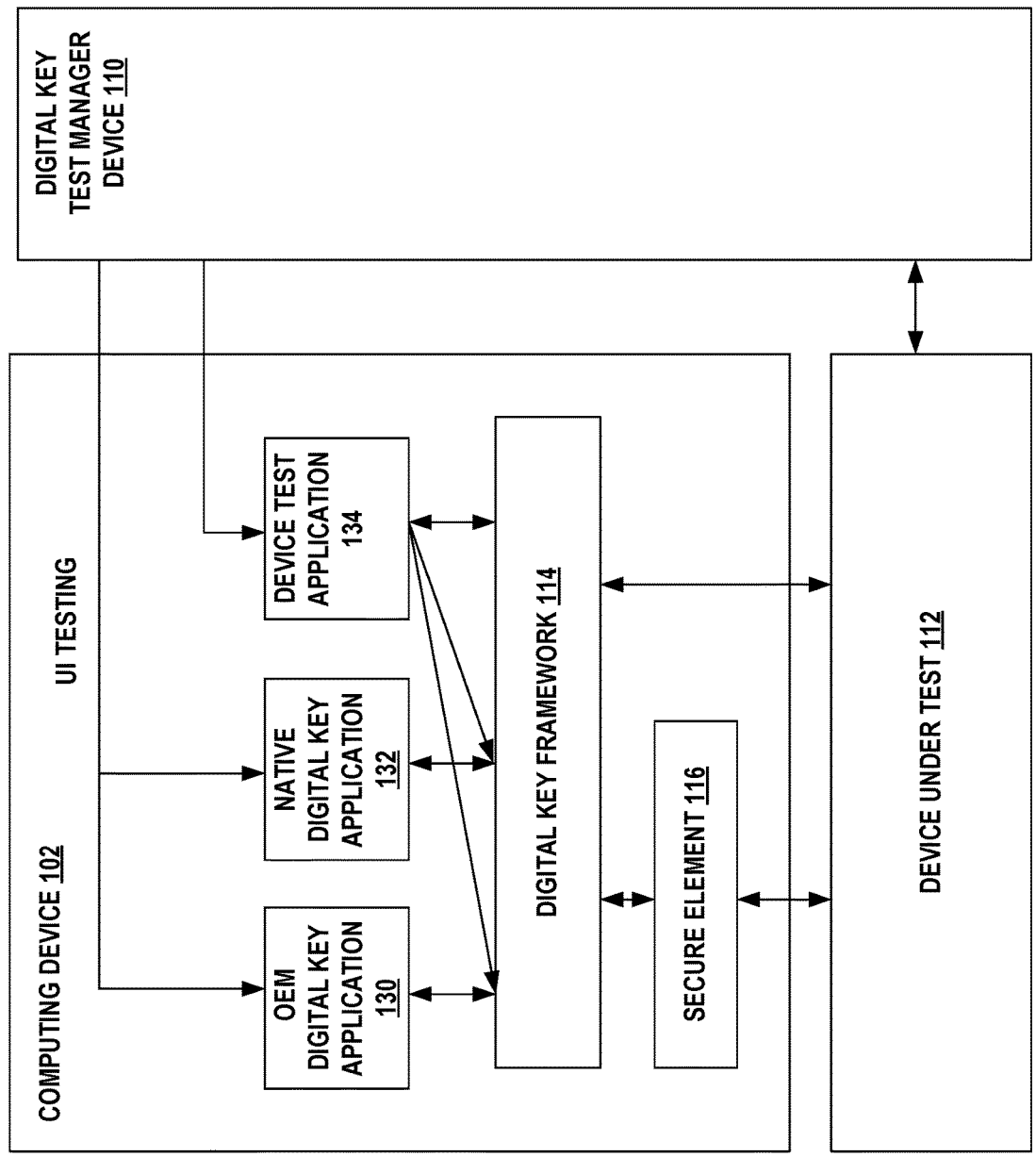
FIG. 1C is a conceptual diagram illustrating a device test application and digital key test manager device illustrating user interface (UI) testing, in accordance with one or more techniques of this disclosure.
Figure 1D:
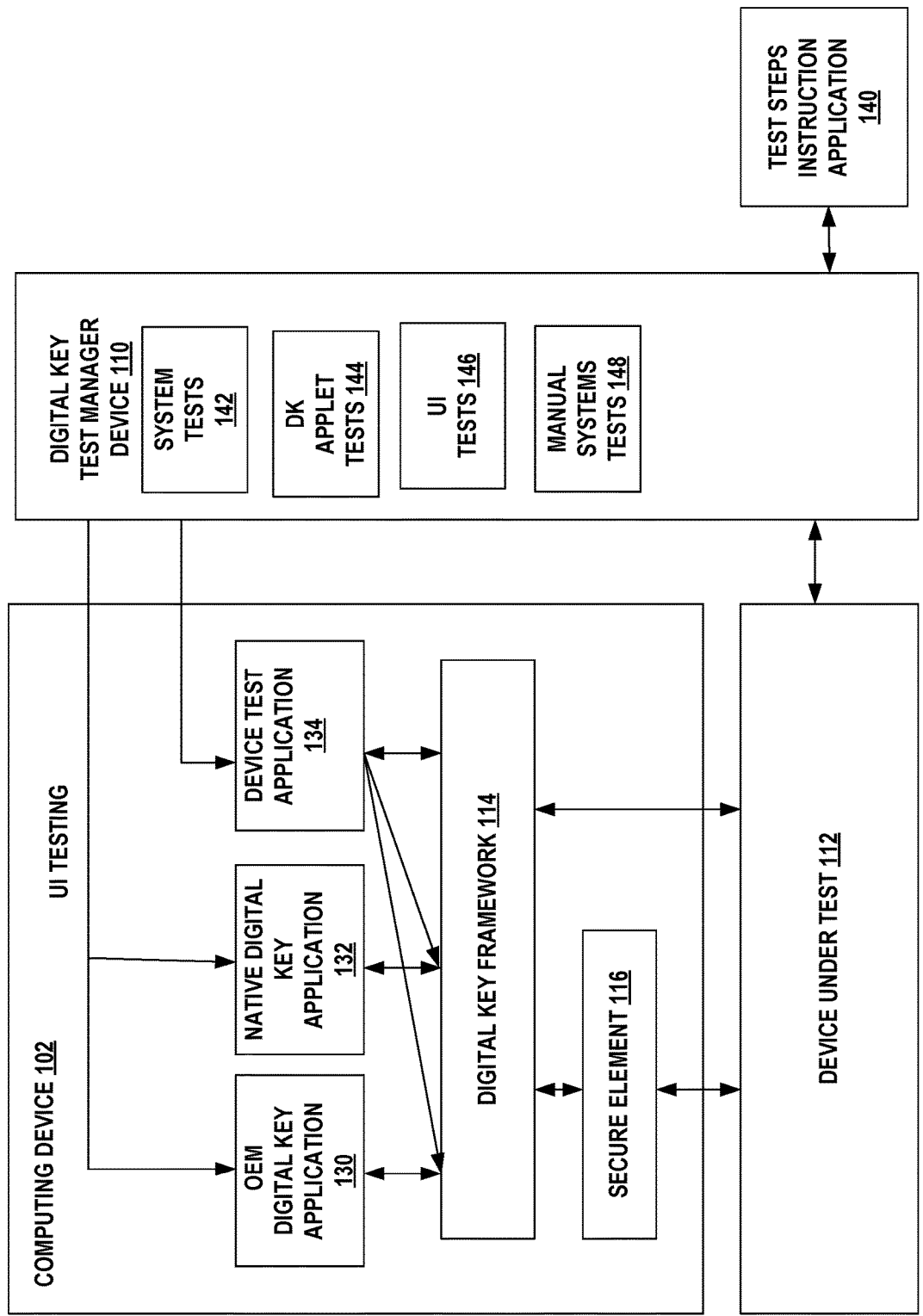
FIG. 1D is a conceptual diagram illustrating a digital key test manager device with testing extensions, in accordance with one or more techniques of this disclosure.
Figure 1E:
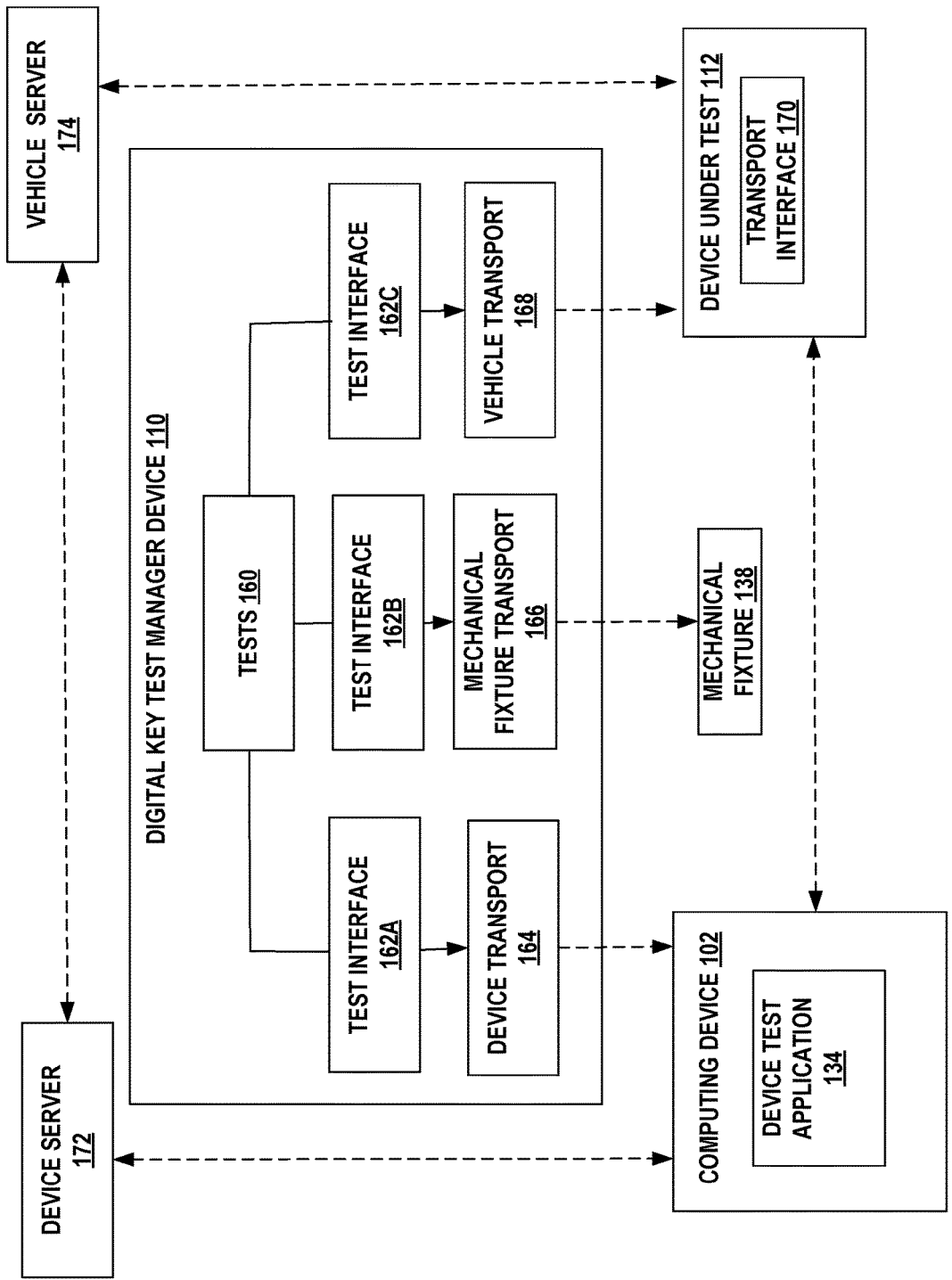
FIG. 1E is a conceptual diagram illustrating a device test application and digital key test manager device, in accordance with one or more techniques of this disclosure.
Figure 1F:
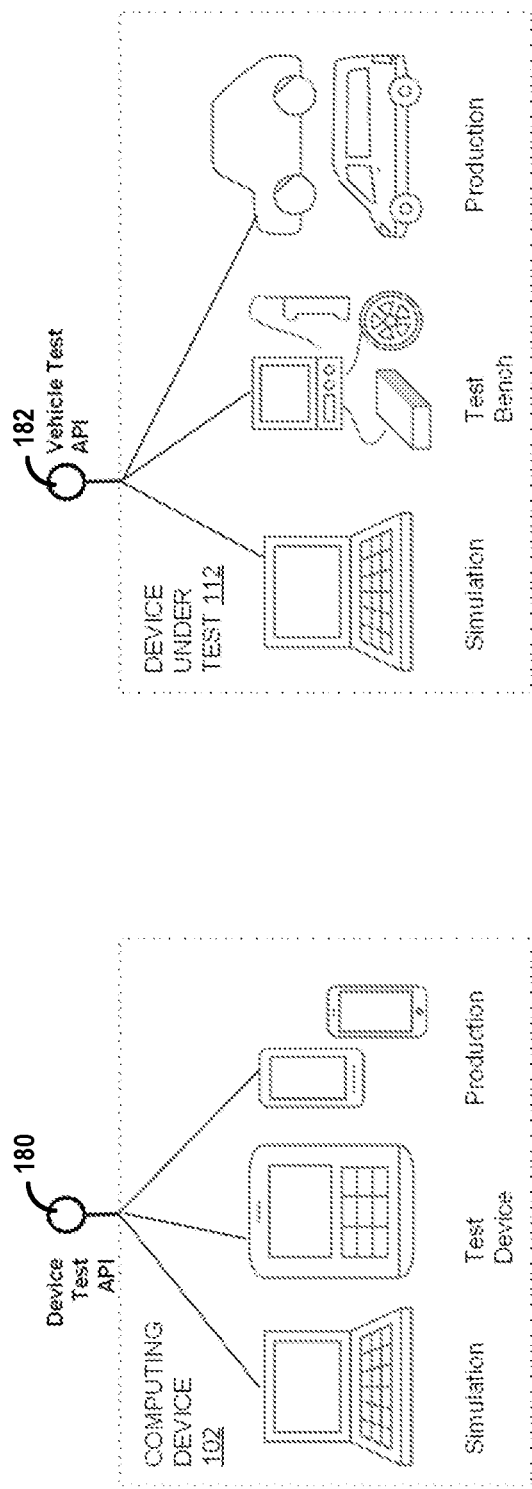
FIG. 1F is a conceptual diagram illustrating application programming interfaces (APIs) for the computing device and the device under test, in accordance with one or more techniques of this disclosure.

Digital key test manager device 110 may control mechanical fixture 138, shown in FIGS. 1B and 1E, to move the computing device 102 to test device under test 112, such as move computing device 102 to a wireless communication module such as a near-field communication (NFC) reader, UltraWideBand (UWB), personal area network, wireless network, or cellular network. Digital key test manager device 110 may do user interface (UI) testing of an original equipment manufacturer (OEM) digital key application 130 or native application digital key application 132 at the computing device 102. Computing device 102 may include device test application 134. The digital key may be a digital car key and the digital key test manager device 110 may be a digital key test manager device Device test application 134 may provide a set of standard test instructions to digital key framework 114. Device test application 134 may emulate a digital key application, such as OEM digital key application 130 or native digital key application 132. Digital key framework 114 may generate and send messages for secure element 116 from the set of standard test instructions. Secure element 116 may generate modified messages based on the messages from digital key framework 114 and provide the modified messages from secure element 116 to device under test 112 to evaluate digital key functionality.

The set of standard test instructions may be received from digital key test manager device 110 or generated at device test application 134, such as a result of receiving a message from digital key test manager device 110 to generate the set of standard test instructions.

Digital key test manager device 110 may generate standard DK instructions for device test application 134 to send messages to device under test 112. Digital key test manager device 110 may communicate with device under test 112 to determine the operations of device under test 112 and, as a result of the messages, evaluate at digital key test manager device 110 the operations of device under test 112 to assess digital key functionality.

Digital key test manager device 110 may provide the set of standard test instructions as part of a first phase test that does not require a connection to a server and have a second phase test including providing additional standard DK instructions requiring connection to the server.

As shown in FIG. 1D discussed below, digital key test manager device 110 may do user interface (UI) testing of an original equipment manufacturer (OEM), native application applet tests for secure element 116 and manual step instructions for a test steps instruction application.

FIG. 1B is a conceptual diagram illustrating device test application 134, digital key test manager device 110, sniffer module 136, radio frequency (RF) disrupter 137 and mechanical fixture 138, in accordance with one or more techniques of this disclosure. Sniffer module 136 may be used to detect wireless signals between computing device 102 and device under test 112. Radio frequency (RF) disrupter 137 may be used to disrupt signals from the computing device 102 to the device under test 112 to test error handling and recovery. Mechanical fixture 138 may be a robotic arm that is used to tap a phone, such as computing device 102, on a wireless communication module such as a near-field communication (NFC) reader, UltraWideBand (UWB), personal area network, wireless network, or cellular network. For example, mechanical fixture 138 may move the computing device next to and away from the wireless communication module. Digital key test manager device 110 may control sniffer module 136, radio frequency (RF) disrupter 137 and mechanical fixture 138.

FIG. 1C is a conceptual diagram illustrating a device test application and digital key test manager device illustrating user interface (UI) testing, in accordance with one or more techniques of this disclosure. FIG. 1C shows the connection of digital key test manager device 110 to device test application 134, through standardized DK device test APIs, and to device under test 112, such as a vehicle simulation, a vehicle test bench using vehicle components or a real vehicle through standardized DK vehicle test APIs.

FIG. 1D is a conceptual diagram illustrating a digital key test manager device with testing extensions, in accordance with one or more techniques of this disclosure. System tests 142 may be a system test plan through the standardized APIs. Digital key (DK) applet tests 144 may allow for testing the applications (applets) run on secure element 116. DK Test Manager may send DK Applet commands that are routed to secure element 116 without any framework logic. This allows testing the applet in a production environment.

User Interface tests 146 allow for the testing of the UI elements of DK applications, such as OEM digital key application 130 and native digital key application 132. User interface tests 146 may be maintained by the application developers to test the user interfaces of OEM digital key application 130 and native digital key application 132.

Manual system tests 148 may be provided by a UI-based application that implements vehicle simulation control. A vehicle operator may use test steps instruction application 140 to walk through the manual test steps.

FIG. 1E is a conceptual diagram illustrating a device test application 234 and digital key test manager device 110, in accordance with one or more techniques of this disclosure. Digital key test manager device 110 may use standard test APIs to allow for a unified testing system. Digital key test manager device 110 may use a common set of tests 260 to test a variety of devices under test and computing devices that implement the standard APIs. Digital key test manager device 110 may use test interfaces 162A, 162B, and 162C and device transport 164, mechanical fixture transport 166, and vehicle transport 168 to get test instructions across to computing device 102, mechanical fixture 138 and device under test 112. Device under test 112 may also implement transport interface 170 to interface with digital key test manager device 110.

Test interfaces 162A, 162B, and 162C may translate tests 160 to a standard API form. Device transport 164, mechanical fixture transport 166, and vehicle transport 168 may implement standard or proprietary transport functionality expected by the computing device 102, mechanical fixture 138, and device under test 112, respectively. Transport interface 170 at device under test 112 may also implement standard or proprietary transport functionality with digital key test manager device 110.

Tests 160 may include test functionality such as test configurations, logs collection, crash reporting, start owner pairing tests, share key tests, screen lock/unlock tests, reboot tests, delete key tests, digital key function reset tests, engine start tests, and/or door open/close tests. Start owner pairing tests may test the functionality of the pairing of an owner with the digital key. Share key tests may test the sharing of a digital key with another device or user. Screen lock/unlock tests may test whether the digital key works correctly with respect to any requirement that the screen needs to be unlocked for digital key operation (for example, to require that a phone is unlocked before the digital key is used). Reboot tests may test whether the digital key operates correctly after a reboot. Delete key tests may test whether the digital key is able to be deleted from computing device 102. Engine start tests may be used to see if the digital key may be used to start or simulate the start of a vehicle engine. Door open/close tests may be used to test the locking and unlocking of a vehicle door.

Servers, such as device server 172 and vehicle server 174, may be used to do some of the functionality for digital key systems such as security, certificate provisioning, password provisioning, etc. This may complicate testing. Some flows require servers such as remote termination flows, key sharing, etc., and connecting to servers requires pre-integration such as cross-signing and connection certificates, endpoints exchange, health checks, etc.

System Testing without servers is hard. The security of flows relies on servers for certificate provisioning, password provisioning, etc. Some flows just require servers, such as remote termination flows, key sharing, etc. Connecting to servers requires pre-integration, cross-signing certificates, endpoint exchange, health checks, etc.

A multiple-tier system may be implemented with initial tiers avoiding the use of remote servers. In one case, Tier 1 has no server involvement. The test APIs may replace server involvement using provisioned passwords, standardized mock certificates, and private keys. Logical flows such as key tracking, termination, sharing, etc. may be emulated. In Tier 2, servers may be involved through Test APIs. In the test environment, the server may provide test APIs (with mock certifications) while the digital key test manager device 110 connects to device under test 112. Tier 3 may be a full system with provisioning and functional flows as in production, with testability APIs mostly replacing user involvement.

FIG. 1F is a conceptual diagram illustrating application programming interfaces (APIs) for computing device 102 and device under test 112, in accordance with one or more techniques of this disclosure. Device test API 180 forms a standard interface to interconnect with computing device 102. A variety of computing devices, such as simulations, test devices, and production devices from multiple manufacturers, may implement device test API 180 and thus help enable the standardized testing environment.

Vehicle test API 182 forms a standard interface to interconnect with device under test 112. A variety of devices under test, such as simulations, test benches, and production vehicles from multiple manufacturers, may implement the vehicle test API 182 and thus help enable the standardized testing environment.

Device test API 180 and vehicle test API 182 may be used to test flow (e.g., owner pairing, key sharing, key management, screen lock/unlock, etc.) without dependency on more applications, and device under test 112, such as a vehicle simulation, a vehicle test bench using vehicle components or a real vehicle to test vehicle actions (e.g., door open/close, engine start, window up/down, etc.)

Standardized testability APIs may include device test API 180 and vehicle test API 182 and further include Ecosystem Testability APIs. The use of standardized testability APIs makes the system device and vehicle agnostic. The testability system may be API-driven and not user interface UI-dependent so is more stable, maintainable, and automatable. Standardized domain-specific actions may include DK steps (such as owner pairing, Key sharing, key management, etc.), device actions (such as screen off/on, Airplane mode, etc.), and vehicle actions such as door open/close, engine start, window up/down, etc. Standard Testability APIs allow for Ecosystem System Testing. Any device and any vehicle that implements the APIs may be tested with a common set of tests. A common shared Test Manager may be implemented and reused to run an ecosystem-standard Test Plan. Exemplary test APIs include Common Testability APIs (such as Start/End Test Logs Collection), Device Testability APIs (such as StartOwnerPairing(pairingPassword, friendly-Name, vehicleBrandId), Screen lock/unlock APIs Reboot Vehicle Testability APIs, ProvisionOwnerPairing (pairing-Password), Engine Start APIs, and Door Open/Close APIs.

One or more advantages of the techniques described in this disclosure include enabling the use of standardized APIs and a standardized DK test manager to reduce costs by passing a common test criterion as part of self-certification or as a quality check before going to an external lab. By reducing integration costs associated with testing, the rate of adoption of digital keys for the whole ecosystem may be improved.

Standardized Testability APIs may be agnostic to the type of Device or Vehicle, model, brand, or OEM used with production, Test, or Simulation. The system may thus be API-driven (not UI-dependent), standardized, stable, maintainable, and automatable. OEMs may implement the test specification and leverage the shared test automation for the device under test.

Devices and vehicles that implement the APIs may leverage described automated test system. Lab Certification may rely on the Test APIs for test automation and consistency. Further, the shared test implementation may be used as a quality check before full certification. A test plan that includes automated pre-tests will result in fewer bugs found in the full certification test.

Figure 2:
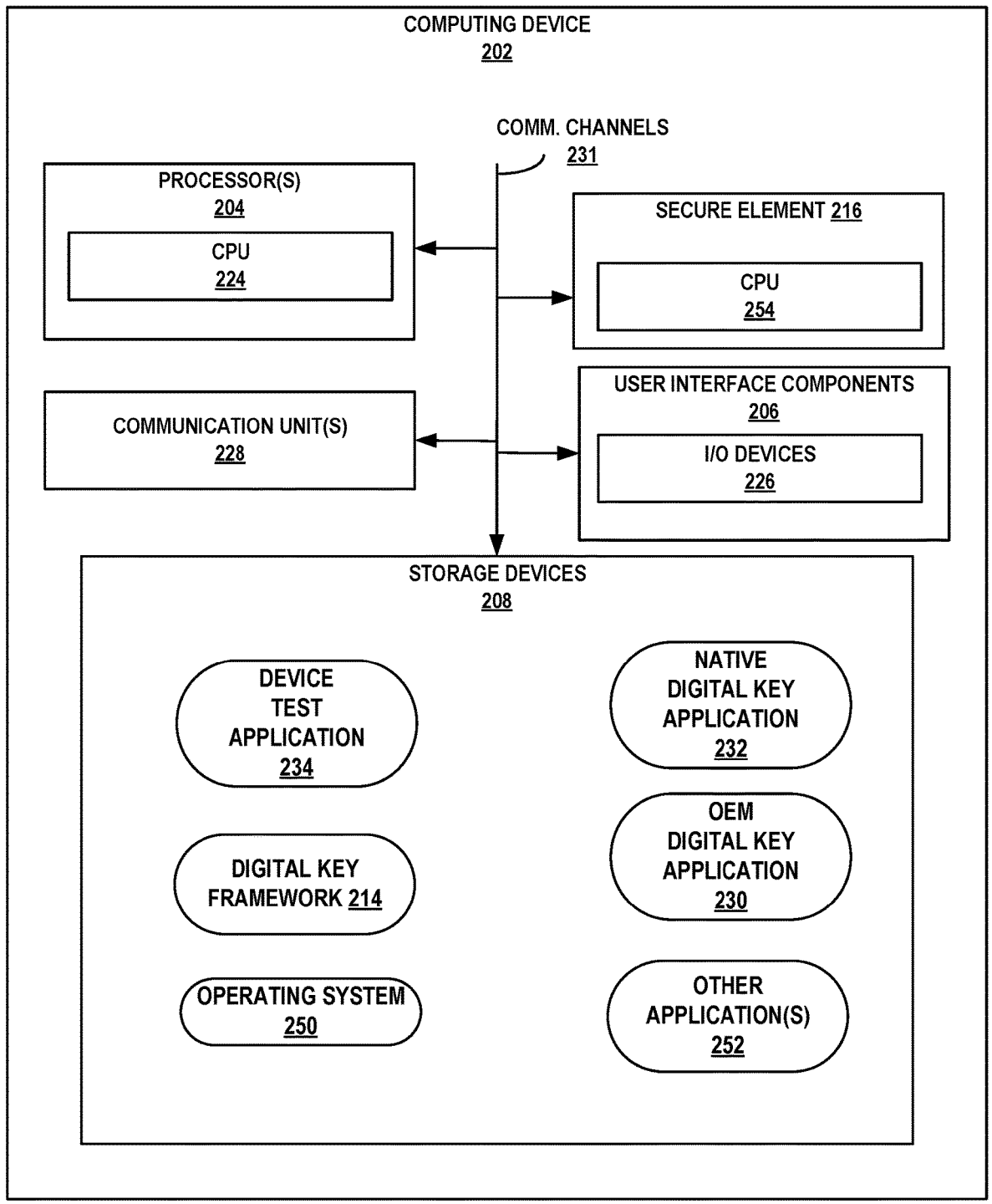
FIG. 2 is a block diagram illustrating an example computing device for digital key testing, in accordance with one or more aspects of the present disclosure.

FIG. 2 is a block diagram illustrating an example computing device for digital key testing, in accordance with one or more aspects of the present disclosure. FIG. 2 illustrates one example computing system that may implement the techniques of this disclosure. Computing device 202 may include desktop computers, servers, mainframes, etc., and may be in communication with remote computing systems over one or more networks. Many other examples of computing device 202 may be used in other instances and may include a subset of the components included in exemplary computing device 202 or may include additional components not shown in FIG. 2.

As shown in the example of FIG. 2, computing device 202 includes processors 204, one or more input/output components, such as user interface components (UIC) 206, one or more communication units 228, and one or more storage devices 208. Storage devices 208 of computing device 202 may include device test application 234, digital key framework 214, native digital key application 232, OEM digital key application 230, operating system 250, and other applications 252.

One or more communication units 228 of computing device 202, for example, may communicate with external devices by transmitting and/or receiving data at computing device 202, such as to and from remote computer systems. For example, computing device 202 may receive, using communication units 228, instructions from digital key test manager device 110 and send signals to and from device under test 112 of FIG. 1A. Example communication units 228 include a network interface card (e.g., such as an Ethernet card), an optical transceiver, a radio frequency transceiver, or any other type of device that may send and/or receive information. Other examples of communication units 228 may be devices configured to transmit and receive Ultrawideband®, Bluetooth®, GPS, 3G, 4G, and Wi-Fi®, etc., that may be found in computing devices, such as mobile devices and the like.

As shown in the example of FIG. 2, communication channels 231 may interconnect each of the components as shown for inter-component communications (physically, communicatively, and/or operatively). In some examples, communication channels 231 may include a system bus, a network connection (e.g., to a wireless connection as described above), one or more inter-process communication data structures, or any other components for communicating data between hardware and/or software locally or remotely.

One or more storage devices 208 within computing device 202 may store information, such as data associated with applications and other data discussed herein, for processing during the operation of computing device 202. In some examples, one or more storage devices of storage devices 208 may be a volatile or temporary memory. Examples of volatile memories include random access memories (RAM), dynamic random-access memories (DRAM), static random-access memories (SRAM), and other forms of volatile memories known in the art. Storage devices 208, in some examples, may also include one or more computer-readable storage media. Storage devices 208 may be configured to store larger amounts of information for longer terms in non-volatile memory than volatile memory. Examples of non-volatile memories include magnetic hard disks, optical discs, floppy discs, flash memories, or forms of electrically programmable memories (EPROM) or electrically erasable and programmable (EEPROM) memories. Storage devices 208 may store program instructions and/or data associated with the device test application 234, digital key framework 214, native digital key application 232, OEM digital key application 230, operating system 250 and other applications 252 of FIG. 2.

One or more I/O devices 226 of computing device 202 may receive inputs and generate outputs. Examples of inputs are tactile, audio, kinetic, and optical input, to name only a few examples. Input devices of I/O devices 226, in one example, may include a touchscreen, a touchpad, a mouse, a keyboard, a voice responsive system, a video camera, buttons, a control pad, a microphone, or any other type of device for detecting input from a human or machine. Output devices of I/O devices 226, may include a sound card, a video graphics adapter card, a speaker, a display, or any other type of device for generating output to a human or machine.

Device test application 234 may be a version of device test application 134 of FIGS. 1A-1D. Digital key framework 214 may be a version of digital key framework 114 of FIGS. 1A-1D. Native digital key application 232 may be a version of native digital key application 132 of FIGS. 1A-1D. OEM digital key application 230 may be a version of OEM digital key application 130 of FIGS. 1A-1D

Device test application 234, digital key framework 214, native digital key application 232, OEM digital key application 230, operating system 250 and other applications 252 may perform operations described herein using software, hardware, firmware, or a mixture of hardware, software, and firmware residing in and executing on computing device 202 or at one or more other remote computing devices (e.g., cloud-based application—not shown). Computing device 202 may execute one or more of device test application 234, digital key framework 214, native digital key application 232, OEM digital key application 230, operating system 250, and other applications 252, with one or more processors 204 or as or within a virtual machine executing on the underlying hardware. One or more of device test application 234, digital key framework 214, native digital key application 232, OEM digital key application 230, operating system 250, and other applications 252 may be implemented in various ways, for example, as a downloadable or pre-installed application, remotely as a cloud application, or as part of the operating system of computing device 202. Other examples of computing device 202 that implement techniques of this disclosure may include additional components not shown in FIG. 2.

In the example of FIG. 2, one or more processors 204 may implement functionality and/or execute instructions within computing device 202. For example, one or more processors 204 may receive and execute instructions that provide the functionality of UIC 206, communication units 228, one or more storage devices 208, and an operating system to perform one or more operations as described herein. One or more processors 204 include central processing unit (CPU) 224. Examples of CPU 224 include, but are not limited to, a digital signal processor (DSP), a general-purpose microprocessor, a tensor processing unit (TPU); a neural processing unit (NPU); a neural processing engine; a core of a CPU, VPU, GPU, TPU, NPU or another processing device, an application specific integrated circuit (ASIC), a field programmable logic array (FPGA), or other equivalent integrated or discrete logic circuitry, or other equivalent integrated or discrete logic circuitry.

One or more processors 204 may implement functionality and/or execute instructions within computing device 202. For example, one or more processors 204 may receive and execute instructions that provide the functionality of device test application 234, digital key framework 214, native digital key application 232, OEM digital key application 230, operating system 250 and other applications 252 to perform one or more operations and various functions described herein.

As shown in FIG. 2, storage devices 208 may include operating system 250 ("OS 250") that provides an execution environment for one or more applications, such as device test application 234, digital key framework 214, native digital key application 232, OEM digital key application 230, and other applications 252. OS 250 may represent a multi-threaded operating system or a single-threaded operating system. OS 250 may include a kernel that facilitates access to the underlying hardware of computing device 202, where the kernel may present a number of different interfaces (e.g., application programmer interfaces—APIs) that device test application 234, digital key framework 214, native digital key application 232, OEM digital key application 230, and other applications 252 may invoke to access the underlying hardware of computing device 120.

Secure element (SE) 216, which may correspond to secure element 116 of FIGS. 1A-1D, may be a tamper-resistant element capable of securely hosting applications and their confidential and cryptographic data (for example, cryptographic keys) in accordance with the rules and security requirements set by well-identified trusted authorities. Secure element 216 may include CPU 254, such as a one-chip secure microcontroller. With multiple applications running on a single device, secure element 216 may host trusted applications and their associated credentials in a secure environment. Secure element 216 may be used for functions such as authentication, identification, signatures and PIN management.

FIG. 3 is a block diagram illustrating digital key test manager device 310 for digital key testing, in accordance with one or more aspects of the present disclosure. FIG. 3 illustrates one example computing device that may implement the techniques of this disclosure. Digital key test manager device 310 may include desktop computers, servers, mainframes, etc., and may be in communication with remote computing systems over one or more networks. Many other examples of digital key test manager device 310 may be used in other instances and may include a subset of the components included in digital key test manager device 310 or may include additional components not shown in FIG. 3.

As shown in the example of FIG. 3, digital key test manager device 310 includes processors 304, one or more input/output components, such as user interface components (UIC) 306, one or more communication units 328, and one or more storage devices 308. Storage devices 308 of digital key test manager device 310 may include digital key test manager application 311, extensions including system tests 342, DK applet tests 344, UI tests 346 and manual system test 348, operating system 350, and other applications 352.

One or more communication units 328 of digital key test manager device 310, for example, may communicate with external devices by transmitting and/or receiving data at digital key test manager device 310, such as to and from remote computer systems. For example, digital key test manager device 310 may receive, using communication units 328, instructions from digital key test manager device 110 and send signals to and from device under test 112 of FIGS. 1A-1E. Example communication units 328 include a network interface card (e.g., such as an Ethernet card), an optical transceiver, a radio frequency transceiver, or any other type of device that may send and/or receive information. Other examples of communication units 328 may be devices configured to transmit and receive Ultrawideband®, Bluetooth®, GPS, 3G, 4G, and Wi-Fi®, etc., that may be found in computing devices, such as mobile devices and the like.

As shown in the example of FIG. 3, communication channels 331 may interconnect each of the components as shown for inter-component communications (physically, communicatively, and/or operatively). In some examples, communication channels 331 may include a system bus, a network connection (e.g., to a wireless connection as described above), one or more inter-process communication data structures, or any other components for communicating data between hardware and/or software locally or remotely.

One or more storage devices 308 within digital key test manager device 310 may store information, such as data associated with applications and other data discussed herein, for processing during the operation of digital key test manager device 310. In some examples, one or more storage devices of storage devices 308 may be a volatile or temporary memory. Examples of volatile memories include random access memories (RAM), dynamic random-access memories (DRAM), static random-access memories (SRAM), and other forms of volatile memories known in the art. Storage devices 308, in some examples, may also include one or more computer-readable storage media. Storage devices 308 may be configured to store larger amounts of information for longer terms in non-volatile memory than volatile memory. Examples of non-volatile memories include magnetic hard disks, optical discs, floppy discs, flash memories, or forms of electrically programmable memories (EPROM) or electrically erasable and programmable (EEPROM) memories. Storage devices 308 may store program instructions and/or data associated with digital key test manager application 311, extensions including system tests 342, DK applet tests 344, UI tests 346 and manual system test 348, operating system 350, and other applications 352. of FIG. 3.

One or more I/O devices 326 of digital key test manager device 310 may receive inputs and generate outputs. Examples of inputs are tactile, audio, kinetic, and optical input, to name only a few examples. Input devices of I/O devices 326, in one example, may include a touchscreen, a touchpad, a mouse, a keyboard, a voice responsive system, a video camera, buttons, a control pad, a microphone, or any other type of device for detecting input from a human or machine. Output devices of I/O devices 326, may include a sound card, a video graphics adapter card, a speaker, a display, or any other type of device for generating output to a human or machine.

Digital key test manager application 311 may be a version of digital key test manager application 110 of FIGS. 1A-1E. System tests 342 may be a version of system tests 142 of FIG. 1D. DK applet tests 344 may be a version of DK applet tests 144 of FIG. 1D. UI tests 346 may be a version of UI tests 146 of FIG. 1D. Manual system test 348 may be a version of manual system test 148 of FIG. 1D.

Device test application 334 may be a version of device test application 134 of FIGS. 1A-1E. Digital key framework 214 may be a version of digital key framework 114 of FIGS. 1A-1E. Native digital key application 232 may be a version of native digital key application 132 of FIGS. 1A-1D. OEM digital key application 230 may be a version of OEM digital key application 130 of FIGS. 1A-1E.

Digital key test manager application 311, extensions including system tests 342, DK applet tests 344, UI tests 346 and manual system test 348, operating system 350 and other applications 352, may perform operations described herein using software, hardware, firmware, or a mixture of hardware, software, and firmware residing in and executing on digital key test manager device 310 or at one or more other remote computing devices (e.g., cloud-based application—not shown). Digital key test manager device 310 may execute one or more of digital key test manager application 311, extensions including system tests 342, DK applet tests 344, UI tests 346 and manual system test 348, operating system 350, and other applications 352, with one or more processors 304 or as or within a virtual machine executing on the underlying hardware. One or more of digital key test manager application 311, extensions including system tests 342, DK applet tests 344, UI tests 346 and manual system test 348, operating system 350, and other applications 352, may be implemented in various ways, for example, as a downloadable or pre-installed application, remotely as a cloud application, or as part of the operating system of digital key test manager device 310. Other examples of digital key test manager device 310 that implement techniques of this disclosure may include additional components not shown in FIG. 3.

In the example of FIG. 3, one or more processors 304 may implement functionality and/or execute instructions within digital key test manager device 310. For example, one or more processors 204 may receive and execute instructions that provide the functionality of UIC 306, communication units 328, one or more storage devices 308, and an operating system to perform one or more operations as described herein. One or more processors 304 include central processing unit (CPU) 324. Examples of CPU 324 include, but are not limited to, a digital signal processor (DSP), a general-purpose microprocessor, a tensor processing unit (TPU); a neural processing unit (NPU); a neural processing engine; a core of a CPU, VPU, GPU, TPU, NPU or another processing device, an application specific integrated circuit (ASIC), a field programmable logic array (FPGA), or other equivalent integrated or discrete logic circuitry, or other equivalent integrated or discrete logic circuitry.

One or more processors 304 may implement functionality and/or execute instructions within digital key test manager device 310. For example, one or more processors 304 may receive and execute instructions that provide the functionality of digital key test manager application 311, extensions including system tests 342, DK applet tests 344, UI tests 346 and manual system test 348, operating system 350 and other applications 352 to perform one or more operations and various functions described herein.

As shown in FIG. 3, storage devices 308 may include operating system 350 ("OS 350") that provides an execution environment for one or more applications, such as digital key test manager application 311, extensions including system tests 342, DK applet tests 344, UI tests 346 and manual system test 348, and other applications 352. OS 350 may represent a multi-threaded operating system or a single-threaded operating system. OS 350 may include a kernel that facilitates access to the underlying hardware of digital key test manager device 310, where the kernel may present a number of different interfaces (e.g., application programmer interfaces—APIs) that digital key test manager application 311, extensions including system tests 342, DK applet tests 344, UI tests 346 and manual system test 348, and other applications 352 may invoke to access the underlying hardware of digital key test manager device 310.

Figure 4A:
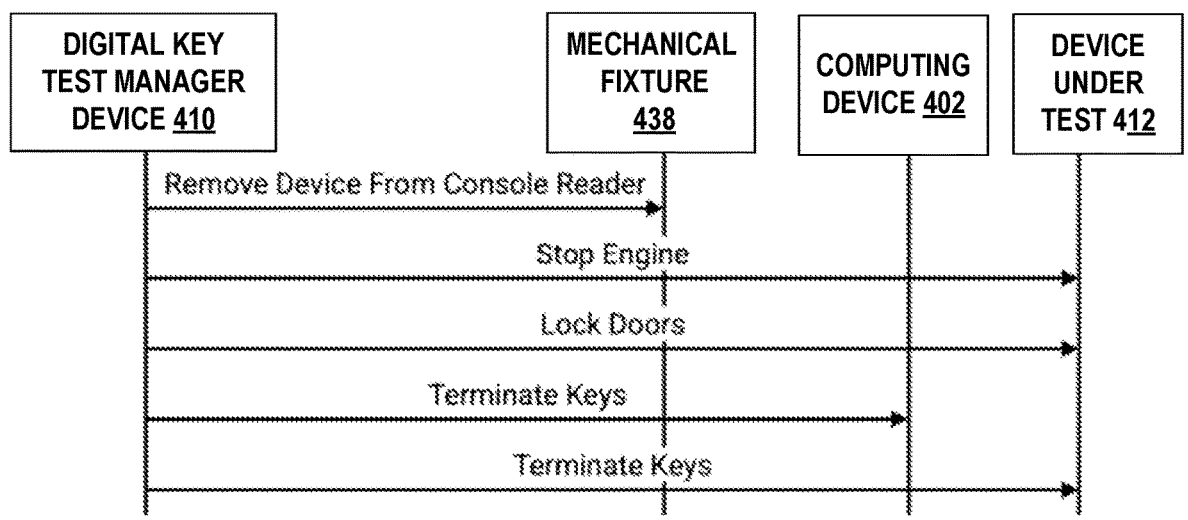
FIG. 4A is a flow diagram illustrating an exemplary setup test case of a digital key test process in accordance with one or more aspects of the present disclosure.
Figure 4B:
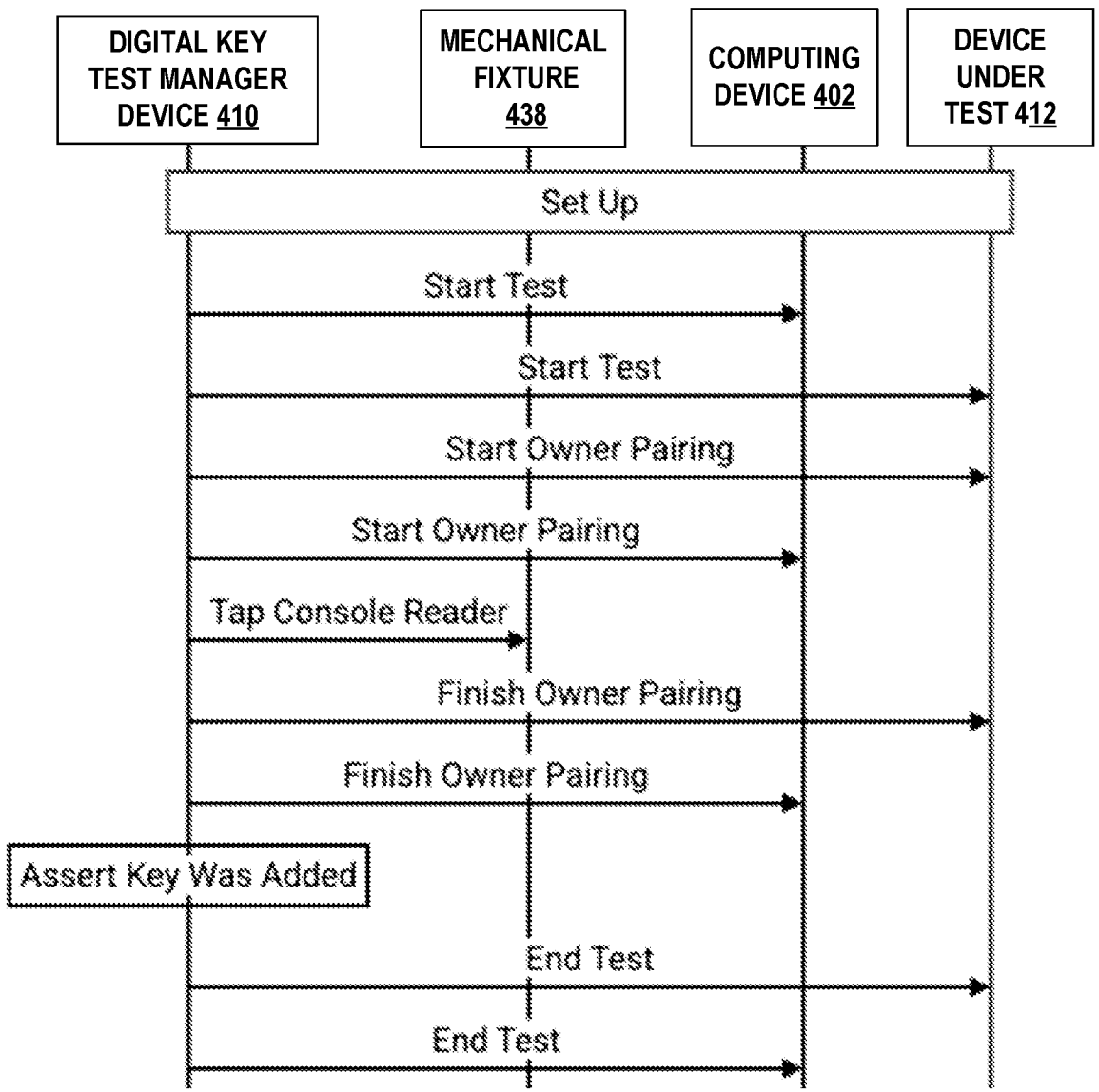
FIG. 4B is a flow diagram illustrating an exemplary owner pairing test case of a digital key test process in accordance with one or more aspects of the present disclosure.
Figure 4C:
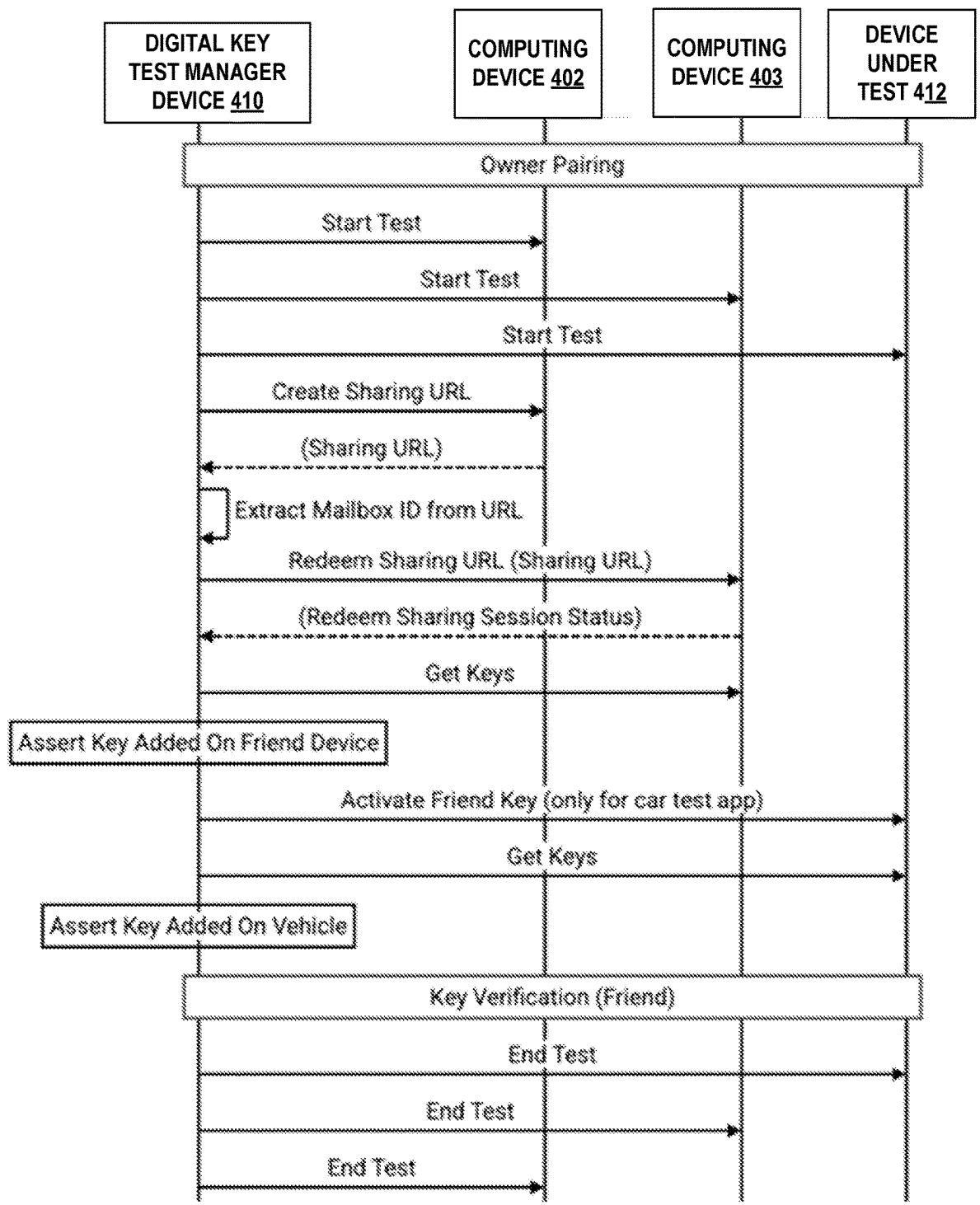
FIG. 4C is a flow diagram illustrating an exemplary key-sharing test case of a digital key test process in accordance with one or more aspects of the present disclosure.

FIGS. 4A-4C illustrate exemplary testing flows that can be implemented using the system of FIG. 1A-1F with digital key test manager device 110, mechanical fixture 138 computing device 102 and device under test 112 as well as related test APIs, such as device test API 180 and vehicle test API 182. Digital key test manager device 410 corresponds to digital key test manager device 110 of FIGS. 1A-1E. Mechanical fixture 438 corresponds to mechanical fixture 138 of FIGS. 1A-1E. Computing device 402 corresponds to computing device 102 of FIGS. 1A-1E. Device under test 412 corresponds to device under test 112 of FIGS. 1A-1E. The testing flows and steps of FIGS. 4A-4C are merely exemplary, and other testing flows and steps may be used in addition or in place of the testing flows and steps of FIGS. 4A-4C. For each test step in the testing flows of FIGS. 4A-4C, the digital key test manager 110 may evaluate and log whether the test step was a success or a failure.

FIG. 4A is a flow diagram illustrating an exemplary setup test case of a digital key test process in accordance with one or more aspects of the present disclosure. In this example, digital key test manager device 410 may send a signal to mechanical fixture 438 to physically move the computing device 402 away from a console reader. Digital key test manager device 410 may send a stop engine signal and a lock doors signal to device under test 412. Digital key test manager device 410 may send a terminate keys signal to computing device 402 and to device under test 412.

FIG. 4B is a flow diagram illustrating an exemplary owner pairing test case of a digital key test process in accordance with one or more aspects of the present disclosure. Digital key test manager device 410 may send a start test signal to computing device 402 and to device under test 412. Digital key test manager device 410 may then send start owner pairing signal to computing device 402 and to device under test 412. Digital key test manager device 410 may send a signal to mechanical fixture 438 to physically move the computing device 402 to the console reader. At that point, digital key test manager device 410 may then send a finish owner pairing signal to computing device 402 and to device under test 412. Digital key test manager device 410 may then send an end test signal to computing device 402 and to device under test 412.

FIG. 4C is a flow diagram illustrating an exemplary key-sharing test case of a digital key test process in accordance with one or more aspects of the present disclosure. In this test flow, computing device 402 is an owner device, and computing device 403 is a friend device that is to receive a shared key. Computing device 403 may structurally correspond to computing device 102 of FIGS. 1A-1E.

Digital key test manager device 410 may send a start test signal to computing device 402, to computing device 403, and to device under test 412. Digital key test manager device 410 may request a sharing Uniform Resource Locator (URL) from the computing device 402 (owner device). Computing device 402 may provide the sharing URL to digital key test manager device 410. Digital key test manager device 410 may then extract the mailbox ID from the sharing URL and redeem the sharing URL with computing device 403 (friend device). After a response from computing device 403 (friend device), digital key test manager device 410 may send a get keys signal to computing device 403 (friend device). At this point, the shared key is loaded up at computing device 403 (friend device). Digital key test manager device 410 may then activate the friend key and get keys with device under test 412. At this point, computing device 403 (friend device) may do a key verification with device under test 112. Digital key test manager device 410 may then send an end test signal to computing device 402, to computing device 403, and to device under test 412 to end the test.

Figure 5:
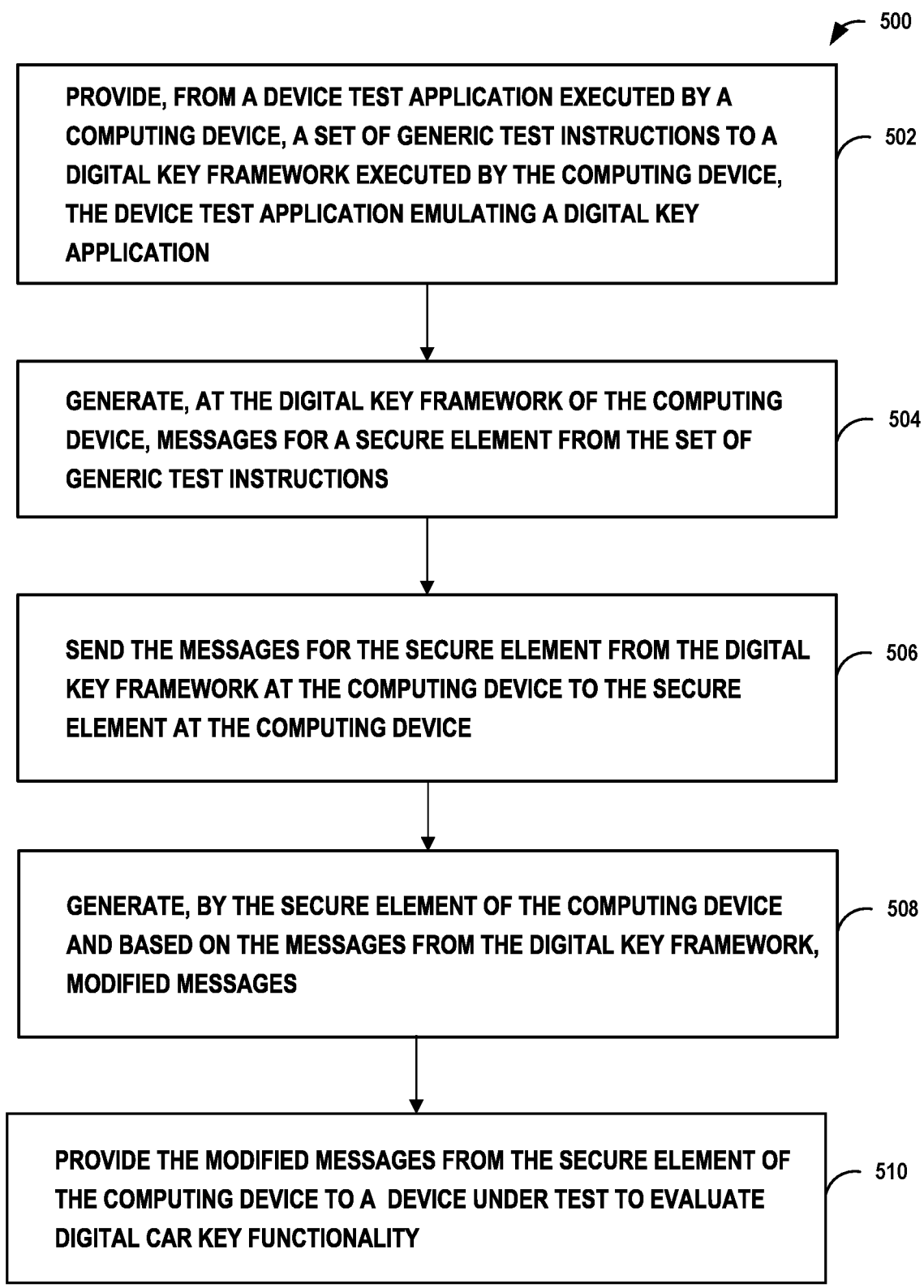
FIG. 5 is a flow diagram illustrating example operations of a digital key test process that is performed by a computing system in accordance with one or more aspects of the present disclosure.

FIG. 5 is a flow diagram illustrating example operations of a digital key test process 500 that is performed by a computing device in accordance with one or more aspects of the present disclosure. For purposes of illustration only, the operations of FIG. 5 are described below within the context of computing device 102 of FIGS. 1A-1E.

Computing device 102 may provide, from a device test application executed by a computing device, a set of standard test instructions to a digital key framework executed by the computing device, the device test application emulating a digital key application (502). Computing device 102 may generate, at the digital key framework of the computing device, messages for a secure element from the set of standard test instructions (504). Computing device 102 may send the messages for the secure element from the digital key framework at the computing device to the secure element at the computing device (506). Computing device 102 may generate, by the secure element of the computing device and based on the messages from the digital key framework, modified messages (508). Computing device 102 may provide the modified messages from the secure element of the computing device to a device under test to evaluate functionality of the digital key (510).

Figure 6:
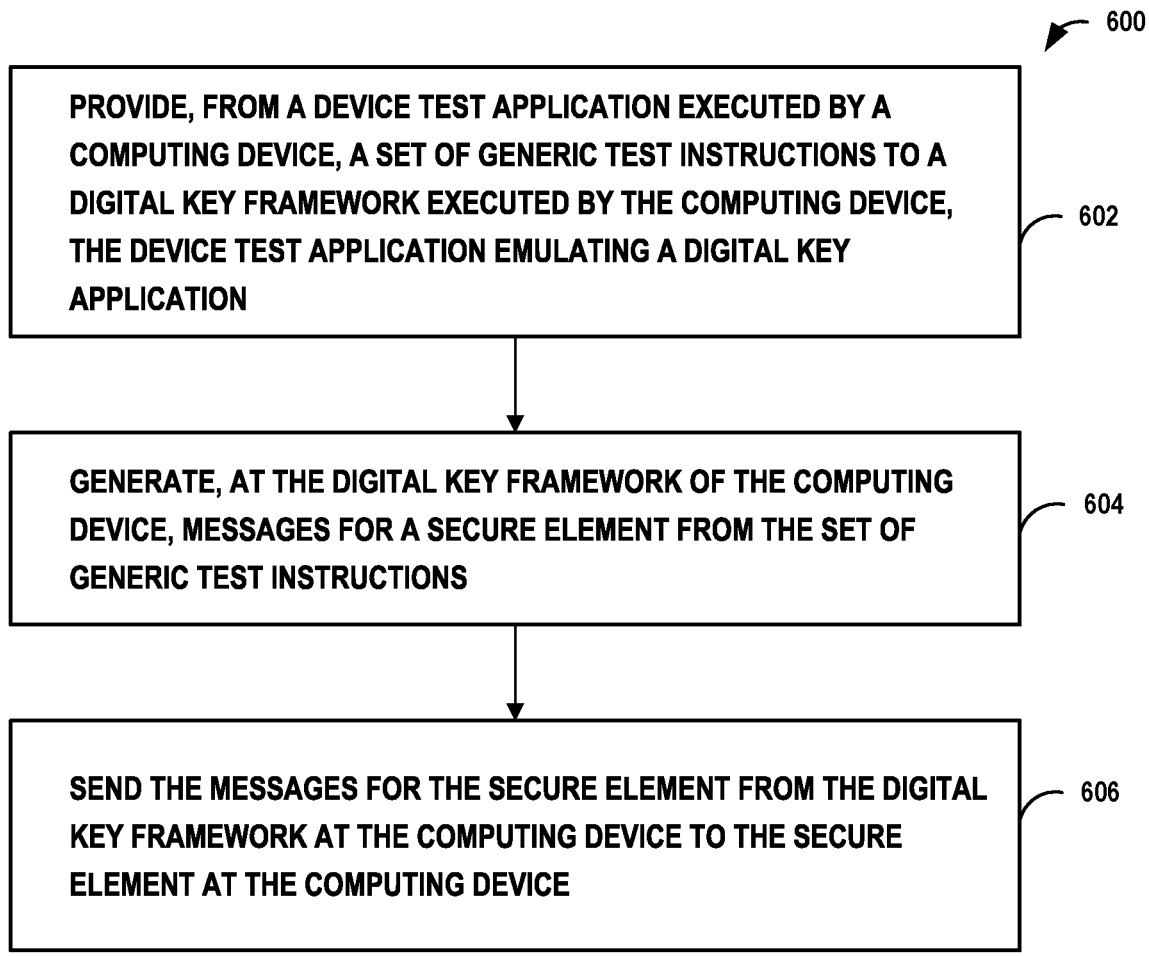
FIG. 6 is a flow diagram illustrating example operations of a digital key test process that is performed by a digital key test manager device in accordance with one or more aspects of the present disclosure.

FIG. 6 is a flow diagram illustrating example operations of a digital key test process 600 that is performed by digital key test manager device 110 in accordance with one or more aspects of the present disclosure. For purposes of illustration only, the operations of FIG. 6 are described below within the context of digital key test manager device 110 of FIGS. 1A-1E.

Digital key test manager device 110 may provide standard digital key instructions for a device test application of a computing device to send messages to a device under test (602). Digital key test manager device 110 may communicate with the device under test to determine operations of the device under test as a result of the messages (604). Digital key test manager device 110 may evaluate, at the digital key test manager device, the operations of the device under test to assess the functionality of the digital key (606).

This disclosure includes the following examples.

Example 1: A method of testing a digital key comprising providing, from a digital key test manager device, standard digital key instructions for a computing device to send messages to a device under test; communicating, from the digital key test manager device, with the device under test to determine operations of the device under test as a result of the messages; and evaluating, at the digital key test manager device, the operations of the device under test to assess functionality of the digital key.

Example 2: The method of example 1, wherein providing the standard digital key instructions for the computing device occurs during a first phase test for testing the digital key that does not require a connection to a server.

Example 3: The method of example 2, further comprising providing, during a second phase test for testing the digital key, the second phase test requiring connection to the server.

Example 4: The method of example 1, further comprising receiving signals from at least one sniffer module that detects communications from the computing device to the device under test.

Example 5: The method of example 1, further comprising controlling a radio frequency (RF) disrupter to disrupt signals to the device under test to test error handling and recovery.

Example 6: The method of example 1, further comprising controlling a mechanical fixture to move the computing device proximate to the device under test to test interactions between the device under test and the computing device.

Example 7: The method of example 1, wherein the device under test is a vehicle, vehicle simulation, or a test bench.

Example 8: The method of example 1, further comprising performing user interface (UI) testing of an original equipment manufacturer (OEM) digital key application or native digital key application at the computing device.

Example 9: The method of example 1, further comprising sending manual step instructions to a test steps instruction application.

Example 10: The method of example 1, wherein the computing device includes a device test application which receives the standard digital key instructions from the digital key test manager device and provides messages to the device under test through a digital key framework at the computing device.

Example 11: A digital key test manager device for a digital key comprising memory; and at least one processor communicably coupled to the memory and configured to: provide standard digital key instructions for a device test application of a computing device to send messages to a device under test; communicate with the device under test to determine operations of the device under test as a result of the messages; and evaluate the operations of the device under test to assess functionality of the digital key.

Example 12. The digital key test manager device of example 11, wherein providing the standard digital key instructions for the computing device occurs during a first phase test for testing the digital key that does not require a connection to a server.

Example 13: The digital key test manager device of example 12, further comprising providing, during a second phase test for testing the digital key, the second phase test requiring connection to the server.

Example 14: The digital key test manager device of example 11, wherein the at least one processor is further configured to receive signals from at least one sniffer module that detects communications from the computing device to the device under test.

Example 15: The digital key test manager device of example 11, wherein the at least one processor is further configured to control a radio frequency (RF) disrupter to disrupt signals to the device under test to test error handling and recovery.

Example 16: The digital key test manager device of example 11, wherein the at least one processor is further configured to control a mechanical fixture to test the device under test.

Example 17: The digital key test manager device of example 11, wherein the device under test is a vehicle, vehicle simulation, or a test bench.

Example 18: The digital key test manager device of example 11, wherein the at least one processor is further configured to perform user interface (UI) testing of an original equipment manufacturer (OEM) or native application at the computing device.

Example 19: The digital key test manager device of example 11, wherein the at least one processor is further configured to send manual step instructions to a test steps instruction application.

Example 20: The digital key test manager device of example 11, further comprising a computing device including a device test application which receives the standard digital key instructions from the digital key test manager device and provides messages to the device under test through a digital key framework at that computing device.

Example 21: A computer-readable storage medium having stored thereon instructions that, when executed, cause one or more processors to: provide standard digital key instructions for a device test application of a computing device to send messages to a device under test; communicate with the device under test to determine operations of the device under test as a result of the messages; and evaluate the operations of the device under test to assess functionality of a digital key.

Example 22: The computer-readable storage medium of example 21, wherein providing the standard digital key instructions for the computing device occurs during a first phase test for testing the digital key that does not require a connection to a server.

Example 23: The computer-readable storage medium of example 22, further comprising providing, during a second phase test for testing the digital key, the second phase test requiring connection to the server.

Example 24: The computer-readable storage medium of example 21, further comprising instructions to receive signals from at least one sniffer module that detects communications from the computing device to the device under test.

Example 25: The computer-readable storage medium of example 21, further comprising instructions to control a radio frequency (RF) disrupter to disrupt signals to the device under test to test error handling and recovery.

Example 26: The computer-readable storage medium of example 21, further comprising instructions to control a mechanical fixture to move the computing device proximate to the device under test to test interactions between the device under test and the computing device Example 27: The computer-readable storage medium of example 21, wherein the device under test is a vehicle, vehicle simulation, or a test bench.

Example 28: The computer-readable storage medium of example 21, further comprising instructions to perform user interface (UI) testing of an original equipment manufacturer (OEM) digital key application or native digital key application at the computing device.

Example 29: The computer-readable storage medium of example 21, further comprising instructions to send manual step instructions to a test steps instruction application.

Example 30: The computer-readable storage medium of example 21, wherein the computing device includes a device test application which receives the standard digital key instructions from the digital key test manager device and provides messages to the device under test through a digital key framework at that computing device.

Example 31: A method comprising: providing, from a device test application executed by a computing device, a set of standard test instructions to a digital key framework executed by the computing device, the device test application emulating a digital key application; generating, at the digital key framework of the computing device, messages for a secure element from the set of standard test instructions; sending the messages for the secure element from the digital key framework at the computing device to the secure element at the computing device; generating, by the secure element of the computing device and based on the messages from the digital key framework, modified messages; and providing the modified messages from the secure element of the computing device to a device under test to functionality of the digital key.

Example 32: The method of example 31, further comprising: generating, at the digital key framework at the computing device, messages for the device under test from the set of standard test instructions; providing the messages for the device under test from the digital key framework of the computing device to the device under test.

Example 33: The method of example 31, further comprising: receiving, at the device test application of the computing device, the set of standard test instructions from a digital key test manager.

Example 34: The method of example 31, further comprising: generating, at the device test application of the computing device, the set of standard test instructions.

Example 35: The method of example 31, further comprising receiving, at the device test application of the computing device, a message from a digital key test manager to generate the set of standard test instructions.

Example 36: The method of example 31, wherein the providing the set of standard test instructions to the digital key framework at the computing device comprises using a testing application program interface (API) of the digital key framework Example 37: The method of example 36, further comprising sending additional instructions to an original equipment manufacturer (OEM) or native API of the digital key framework Example 38: The method of example 31, wherein the device under test is a vehicle, vehicle simulation or test bench.

Example 39: A computing device comprising: memory; and at least one processor communicably coupled to the memory and configured to: provide, from a device test application executed by the computing device, a set of standard test instructions to a digital key framework executed by the computing device, the device test application emulating a digital key application; generate, at the digital key framework of the computing device, messages for a secure element from the set of standard test instructions; send the messages for the secure element from the digital key framework at the computing device to the secure element at the computing device; generate, by the secure element of the computing device and based on the messages from the digital key framework, modified messages; and provide the modified messages from the secure element of the computing device to a device under test to evaluate functionality of the digital key.

Example 40 The computing device of example 39, wherein the at least one processor is further configured to: generate, at the digital key framework at the computing device, messages for the device under test from the set of standard test instructions; provide the messages for the device under test from the digital key framework of the computing device to the device under test.

Example 41: The computing device of example 40, wherein the at least one processor is further configured to: receive, at the device test application of the computing device, the set of standard test instructions from a digital key test manager.

Example 42: The computing device of example 39, wherein the at least one processor is further configured to: generate, at the device test application of the computing device, the set of standard test instructions.

Example 43: The computing device of example 42, wherein the at least one processor is further configured to: receive, at the device test application of the computing device, a message from a digital key test manager to generate the set of standard test instructions.

Example 44: The computing device of example 39, wherein the providing the set of standard test instructions to the digital key framework at the computing device comprises using a testing application program interface (API) of the digital key framework.

Example 45: The computing device of example 39, wherein the at least one processor is further configured to send additional instructions to an original equipment manufacturer (OEM) or native API of the digital key framework.

Example 46: The computing device of example 39, wherein the device under test is a vehicle, vehicle simulation or test bench.

Example 47: A computer-readable storage medium having stored thereon instructions that, when executed, cause one or more processors of a computing device to: provide, from a device test application executed by the computing device, a set of standard test instructions to a digital key framework executed by the computing device, the device test application emulating a digital key application; generate, at the digital key framework of the computing device, messages for a secure element from the set of standard test instructions; send the messages for the secure element from the digital key framework at the computing device to the secure element at the computing device; generate, by the secure element of the computing device and based on the messages from the digital key framework, modified messages; and provide the modified messages from the secure element of the computing device to a device under test to evaluate digital key functionality.

Example 48: The computer-readable storage medium of example 47, further comprising instructions that, when executed, cause one or more processors of a computing device to generate, at the digital key framework at the computing device, messages for the device under test from the set of standard test instructions; provide the messages for the device under test from the digital key framework of the computing device to the device under test.

Example 49: The computer-readable storage medium of example 48, further comprising instructions that, when executed, cause one or more processors of a computing device to receive, at the device test application of the computing device, the set of standard test instructions from a digital key test manager.

Example 50: The computer-readable storage medium of example 48, further comprising instructions that, when executed, cause one or more processors of a computing device to: generate, at the device test application of the computing device, the set of standard test instructions.

Example 51: The computer-readable storage medium of example 47, further comprising instructions that, when executed, cause one or more processors of a computing device to: receive, at the device test application of the computing device, a message from a digital key test manager to generate the set of standard test instructions.

Example 52: The computer-readable storage medium of example 47, further comprising instructions that, when executed, cause one or more processors of a computing device to wherein the providing the set of standard test instructions to the digital key framework at the computing device comprises using a testing application program interface (API) of the digital key framework.

Example 53: The computer-readable storage medium of example 47, further comprising instructions that, when executed, cause one or more processors of a computing device to send additional instructions to an original equipment manufacturer (OEM) or native API of the digital key framework.

Example 54: The computer-readable storage medium of example 47, wherein the device under test is a vehicle, vehicle simulation or test bench.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that may be accessed by one or more computers or one or more processors to retrieve instructions, code and/or data structures for implementation of the techniques described in this disclosure. A computer program product may include a computer-readable medium.

By way of example, and not limitation, such computer-readable storage media may comprise RAM, ROM, EEPROM, CD-ROM or other optical disk storage, magnetic disk storage, or other magnetic storage devices, flash memory, or any other storage medium that may be used to store desired program code in the form of instructions or data structures and that may be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of intraoperative hardware units, including one or more processors as described above, in conjunction with suitable software and/or firmware.

It is to be recognized that, depending on the embodiment, certain acts or events of any of the methods described herein may be performed in a different sequence, may be added, merged, or left out altogether (e.g., not all described acts or events are necessary for the practice of the method). Moreover, in certain embodiments, acts or events may be performed concurrently, e.g., through multi-threaded processing, interrupt processing, or multiple processors, rather than sequentially.

In some examples, a computer-readable storage medium comprises a non-transitory medium. The term "non-transitory" indicates that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A method of testing a digital key comprising:
providing, from a digital key test manager device and via a standardized digital key test application programming interface, digital key instructions for a computing device to send messages to a device under test, wherein the device under test is a vehicle, vehicle simulation, or a test bench;
communicating, from the digital key test manager device and via the standardized digital key test application programming interface, with the device under test to determine operations of performed by the device under test as a result of the messages provided via the standardized digital key test application programming interface; and
evaluating, at the digital key test manager device, the operations of the device under test to assess functionality of the digital key.

2. The method of claim 1, wherein providing the digital key instructions for the computing device occurs during a first phase test for testing the digital key that does not require a connection to a server.

3. The method of claim 2, further comprising providing, during a second phase test for testing the digital key, the second phase test requiring connection to the server.

4. The method of claim 1, further comprising receiving signals from at least one sniffer module that detects communications from the computing device to the device under test.

5. The method of claim 1, further comprising controlling a radio frequency (RF) disrupter to disrupt wireless signals to the device under test to test error handling and recovery.

6. The method of claim 1, further comprising controlling a mechanical fixture to move the computing device proximate to the device under test to test interactions between the device under test and the computing device.

7. The method of claim 1, further comprising performing user interface (UI) testing of an original equipment manufacturer (OEM) digital key application or native digital key application at the computing device.

8. The method of claim 1, further comprising sending manual step instructions to a test steps instruction application.

9. The method of claim 1, wherein the computing device includes a device test application which receives the digital key instructions from the digital key test manager device and provides messages to the device under test through a digital key framework at the computing device.

10. A digital key test manager device for a digital key comprising:
memory; and
at least one processor communicably coupled to the memory and configured to:
provide, via a standardized digital key test application programming interface, digital key instructions for a device test application of a computing device to send messages to a device under test, wherein the device under test is a vehicle, vehicle simulation, or a test bench;
communicate with the device under test via the standardized digital key test application programming interface to determine operations of the device under test as a result of the messages provided via the standardized digital key test application programming interface; and
evaluate the operations of the device under test to assess functionality of the digital key.

11. The digital key test manager device of claim 10, wherein providing the digital key instructions for the computing device occurs during a first phase test for testing the digital key that does not require a connection to a server.

12. The digital key test manager device of claim 11, further comprising providing, during a second phase test for testing the digital key, the second phase test requiring connection to the server.

13. The digital key test manager device of claim 10, wherein the at least one processor is further configured to receive signals from at least one sniffer module that detects communications from the computing device to the device under test.

14. The digital key test manager device of claim 10, wherein the at least one processor is further configured to control a radio frequency (RF) disrupter to disrupt wireless signals to the device under test to test error handling and recovery.

15. The digital key test manager device of claim 10, wherein the at least one processor is further configured to control a mechanical fixture to move the computing device proximate to the device under test to test interactions between the device under test and the computing device.

16. The digital key test manager device of claim 10, wherein the at least one processor is further configured to perform user interface (UI) testing of an original equipment manufacturer (OEM) or native application at the computing device.

17. The digital key test manager device of claim 10, wherein the at least one processor is further configured to send manual step instructions to a test steps instruction application.

18. A computer-readable storage medium having stored thereon instructions that, when executed, cause one or more processors to: provide, via a standardized digital key test application programming interface, digital key instructions for a device test application of a computing device to send messages to a device under test, wherein the device under test is a vehicle, vehicle simulation, or a test bench; communicate with the device under test via the standardized digital key test application programming interface to determine operations of the device under test as a result of the messages provided via the standardized digital key test application programming interface; and evaluate the operations of the device under test to assess functionality of a digital key.

* * * * *